(12) United States Patent
Horbach et al.

(10) Patent No.: US 11,734,187 B2
(45) Date of Patent: Aug. 22, 2023

(54) VALIDATING MEMORY ACCESS PATTERNS OF STATIC PROGRAM CODE

(71) Applicant: International Business Machines Corporation, Armonk, NY (US)

(72) Inventors: Holger Horbach, Aidlingen (DE); Cedric Lichtenau, Stuttgart (DE); Simon Weishaupt, Stuttgart (DE); Puja Sethia, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/550,465

(22) Filed: Dec. 14, 2021

(65) Prior Publication Data

US 2023/0185725 A1    Jun. 15, 2023

(51) Int. Cl.
*G06F 12/10* (2016.01)
(52) U.S. Cl.
CPC ...... *G06F 12/10* (2013.01); *G06F 2212/1056* (2013.01)
(58) Field of Classification Search
CPC ........... G06F 12/10; G06F 12/0862; G06F 2212/6026; G06F 12/0802; G06F 3/0679;
(Continued)

(56) References Cited

U.S. PATENT DOCUMENTS

| 11,113,059 B1* | 9/2021 | Raz | G06F 9/3005 |
| 2012/0038952 A1* | 2/2012 | Cho | G06F 12/1081 358/1.16 |

(Continued)

FOREIGN PATENT DOCUMENTS

WO    2021137669 A1    7/2021

OTHER PUBLICATIONS

Dileesh E D et al: "An application specific dynamic behaviour model using function-call sequence and memory access-graph for execution integrity verification", Abstract Only,Computers & Security, Elsevier Science Publishers. Amsterdam, NL, vol. 107, Apr. 27, 2021 (Apr. 27, 2021), XP086636290, ISSN: 0167-4048, DOI: 10.1016/J.COSE.2021.102299 [retrieved on Apr. 27, 2021].

(Continued)

*Primary Examiner* — Sanjiv Shah
*Assistant Examiner* — Edward Waddy, Jr.
(74) *Attorney, Agent, or Firm* — Heather Johnston

(57) ABSTRACT

A computer system configured to perform operations for validating memory access patterns of a static variant of a program instruction stream, the operations including randomizing a first set of input arguments, generating an address translation list for virtual addresses based on memory access patterns and storing memory accesses in a first table, and executing the static variant of the program instruction stream on the accelerator processing unit. During execution, the virtual addresses may be discarded and replaced by the addresses provided in the address translation list. The operations may include recording and storing every memory access of executing the static variant of the program instruction stream in a second table and comparing the memory access patterns stored in the second table to memory accesses patterns stored in the first table. Memory access patterns may be validated or discarded.

25 Claims, 4 Drawing Sheets

(58) Field of Classification Search
CPC ............. G06F 12/0246; G06F 12/1036; G06F 12/1009; G06F 12/1027; G06F 12/109
USPC ......... 711/203, E12.001, 207, E12.057, 137, 711/154, 100, 217, 170, 158, E12.058, 711/E12.061, E12.068, 206, 205, 221, 711/E12.095
See application file for complete search history.

(56) References Cited

U.S. PATENT DOCUMENTS

| | | | |
|---|---|---|---|
| 2013/0044558 A1* | 2/2013 | Sanjeevarao | G11C 8/12 365/230.06 |
| 2015/0082284 A1 | 3/2015 | Badea | |
| 2015/0286821 A1 | 10/2015 | Ghose | |
| 2016/0378682 A1* | 12/2016 | Sander | G06F 12/1027 711/135 |
| 2017/0161194 A1* | 6/2017 | Loh | G06F 12/1063 |
| 2018/0074709 A1* | 3/2018 | Dreyer | G06F 3/064 |
| 2021/0173934 A1 | 6/2021 | Liu | |

OTHER PUBLICATIONS

Santosh Aditham et al: "Call Trace and Memory Access Pattern based Runtime Insider Threat Detection for Big Data Platforms", Arxiv.org, Cornell University Library, 201 Olin Library Cornell University Thaca, NY 14853, Nov. 22, 2016 (Nov. 22, 2016), XP080733780.

"Patent Cooperation Treaty PCT Notification of Transmittal of the International Search Report and the Written Opinion of the International Searching Authority, or the Declaration", Applicant's file reference P202010143PCT01, International application No. PCT/EP2022/085083, International filing date Dec. 9, 2022 (Dec. 9, 2022), dated Mar. 23, 2023 (Mar. 23, 2023), 14 pages.

* cited by examiner

VALIDATING MEMORY ACCESS PATTERNS OF STATIC PROGRAM CODE

BACKGROUND

The present disclosure relates in general to data processing systems and, in particular, to a computer system, a computer program product, a data processing system, and a computer implemented method for validating memory access patterns of a static variant of a program instruction stream.

When running embedded programmable accelerator processing units in business-critical systems, it is crucial to preserve validity and integrity of the code running on the processing units. One way to achieve this is to allow only pre-validated static program code templates to be executed.

When running in the domain of deep learning algorithms, however, there are many input arguments and variables that need to be provided to the algorithm to suit the specific problem. These need to be passed to said static program code in the form of variables or arguments. The program code can interpret these variables and alter the control flow of the program without the need to change the actual static program instruction stream of it.

In order to provide data to deep learning algorithms, the data must be read from memory and it must be written back to memory during execution and after completion of the program code. On an accelerator processing unit without a dedicated memory management unit that handles translation, the memory accesses performed by the program code are targeting a linear virtual address space. Such system assumes the availability of an external memory translation mechanism that is capable of mapping the virtual addresses provided by the accelerator processing unit to real system memory addresses.

To simplify this mapping mechanism the memory access pattern imposed by the code running on the accelerator processing unit needs to be calculated before program execution. The access pattern is dependent on the arguments passed to the algorithm implemented by the program.

The main challenges in such a system are the matter of extracting and specifying the address access patterns imposed by the program code. This must be done for many or all combinations of input arguments. Further static or templated program code has to be used that only relies on said input variables.

SUMMARY

Embodiments of the present disclosure include a computer system, a computer program product, a data processing system, and a computer implemented method for validating memory access patterns of a static variant of a program instruction stream.

A computer system in accordance with the present disclosure may include a randomizing unit, a program code generator, an accelerator processing unit, an access recorder unit, and a memory. The computer system may be configured to perform operations including randomizing a first set of input arguments and generating, to a flat memory space of the memory, an address translation list for virtual addresses based on primary memory access patterns. The operations may include storing the primary memory access patterns in a first table in the flat memory space and producing, with a code generator, a static variant of a program instruction stream agnostic of the input arguments. The operations may include passing the first set of input arguments to the code generator and executing the static variant of the program instruction stream on the accelerator processing unit; the virtual addresses may be replaced by address translations provided in the address translation list. The operations may include recording and storing secondary memory access patterns of the executing the static variant of the program instruction stream in a second table in the flat memory space and comparing the secondary memory access patterns stored in the second table to the primary memory access patterns stored in the first table. The operations may include validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

A flat memory model may refer to a memory addressing paradigm in which the memory appears to the program as a single contiguous address space. The processing unit may directly and linearly address all of the available memory locations without having to resort to any sort of memory segmentation or paging schemes.

In some embodiments of the present disclosure, a memory address replacement may be performed based on the pre-recorded address translation list.

Randomized input arguments into the deep learning algorithm implemented by the program code are selected. The static variant of the program instruction stream, which may correspond to a production level program code being used with the deep learning algorithm, is executed with these arguments. The accelerator unit the static program code is being executed on does not support any means of address translation. Therefore, the pre-recorded address translation list may be used. For every memory access, the virtual address may be ignored and replaced by the address of the address translation list.

If the access pattern imposed by the static program code matches that of the pre-recorded address list which is already verified, the static program code and the access pattern may be considered correct for the given set of input arguments. Thus, the memory access pattern may be validated.

The disclosure offers several benefits and enables efficient testing of static program code templates within the fields of artificial intelligence acceleration.

The disclosure removes the need to know or the need to simulate a memory access pattern within a testing environment. It facilitates shift-left for testing especially during the development phase of the accelerator program code since the memory access pattern is being recorded during an initial run. The test environment effort is considerably reduced. The method significantly simplifies the testing environment by removing the need for a memory translation unit or software.

The disclosure may be of value primarily to developers of embedded accelerators with extended security needs. Further it may be of value for verification tool vendors.

In some embodiments of the present disclosure, additionally or alternatively, the address translation list may be generated by passing the first set of input arguments to the program code generator for producing a dynamic variant of the program instruction stream tailored to the first set of input arguments and executing the dynamic variant of the program instruction stream on the accelerator processing unit; during execution, all memory translation mechanisms may be deactivated, and a flat memory space may be provided. The embodiment may further include recording and storing memory access of the executing the dynamic variant of the program instruction stream in the first table in the flat memory space.

The randomized input arguments may be passed into the program code generator to produce a dynamic variant of the program instruction stream that is custom-tailored to the input arguments. This custom-tailored version should not be used as final product code because it is not static and could present a security concern. It may be used as a means to further the steps of the process and facilitate simpler program code usage.

The generated dynamic code may be executed on the accelerator processing unit. During execution, all memory translation mechanisms in the system may be deactivated and a flat memory space may be provided. All memory access, direction, and address may be recorded using a suitable hardware mechanism, such as with an access recorder unit, and stored for later use.

In some embodiments of the present disclosure, additionally or alternatively, the address translation list may be generated by pre-calculating address access patterns based on the first set of input arguments.

In some embodiments of the present disclosure, memory address replacement may be used based on a deterministic prediction. For product code, once the static program code has been validated, the memory access pattern for a set of input arguments can be predicted and a list of memory accesses can be loaded into the access recorder unit beforehand. In some embodiments, the address pattern may be pre-calculated based on the input arguments and the address translation list loaded into the access recorder unit for injection of the memory addresses.

In some embodiments of the present disclosure, additionally or alternatively, the memory access may include an address and data to fully describe the memory access.

In some embodiments of the present disclosure, additionally or alternatively, the address translation list may be stored in the access recorder unit. From the access recorder unit, the address translation list may be used for address translation, for example, in an additional part of the process or by further variants of the program instruction stream.

In some embodiments of the present disclosure, additionally or alternatively, replacing the addresses for the memory access may be based on the order of the memory requests of the program instruction stream. In some embodiments, replacement of memory addresses may be based strictly on the order of memory requests for efficient execution of the program code.

In some embodiments of the present disclosure, additionally or alternatively, the address translation list may be preloaded into the access recorder unit before executing the program instruction stream. From the access recorder unit, the address translation list may be used for further address translation in a further step of the process or by further variants of the program instruction stream.

In some embodiments of the present disclosure, additionally or alternatively, the access recorder unit may be configured to record memory accesses as well as to inject memory accesses to the memory. Thus, the access recorder unit may store the memory accesses of a previous run (e.g., of a dynamic variant of the program instruction stream) and may deliver the stored memory accesses in a following run (e.g., of a static variant of the program instruction stream).

In some embodiments of the present disclosure, additionally or alternatively, the access recorder unit may be configured with a selection element for recording a memory access or injecting a memory access to the memory. Such a configuration may facilitate the handling of the access recorder unit for being used in different phases of the validation process of memory access patterns.

In some embodiments of the present disclosure, additionally or alternatively, execution of the static variant of the program instruction stream may be repeated with different sets of input arguments for validating the memory access patterns. Repeating the execution may assure validity of the static program code and predetermined access patterns across many input arguments.

In some embodiments of the present disclosure, additionally or alternatively, an automated regression system may be used for repeating validating the memory access patterns with different sets of input arguments. Thus, various combinations of input arguments may be used for assuring validity of the static program code and predetermined access patterns across may input arguments.

In accordance with some embodiments of the present disclosure, a computer implemented method is proposed for validating memory access patterns of a static variant of a program instruction stream on a computer system, the computer system being at least configured with a randomizing unit, a program code generator, an accelerator processing unit, an access recorder unit, and a memory. The method may include storing the primary memory access patterns in a first table in the flat memory space and producing, with a code generator, a static variant of a program instruction stream agnostic of the input arguments. The method may include passing the first set of input arguments to the code generator and executing the static variant of the program instruction stream on the accelerator processing unit; the virtual addresses may be replaced by address translations provided in the address translation list. The method may include recording and storing secondary memory access patterns of the executing the static variant of the program instruction stream in a second table in the flat memory space and comparing the secondary memory access patterns stored in the second table to the primary memory access patterns stored in the first table. The method may include validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

In some embodiments, a memory address replacement may be performed based on the pre-recorded address translation list.

Randomized input arguments into the deep learning algorithm implemented by the program code may be selected. The static variant of the program instruction stream, which may correspond to a production level program code being used with the deep learning algorithm, may be executed with these arguments. The accelerator unit the static program code is being executed on does not support any means of address translation. The pre-recorded address translation list may thus be used. For every memory access, the virtual address may be ignored and replaced by the address of the address translation list.

If the access pattern imposed by the static program code matches that of the pre-recorded address list which is already verified, the static program code and the access pattern may be considered correct for the given set of input arguments. The memory access pattern is thus validated.

Using the proposed disclosure offers several benefits and enables efficient testing of static program code templates within the fields of artificial intelligence acceleration.

In some embodiments of the present disclosure, the computer system may be configured to generate the address translation list by passing the first set of input arguments to the program code generator for producing a dynamic variant of the program instruction stream being tailored to the first set of input arguments, executing the dynamic variant of the program instruction stream on the accelerator processing unit; during execution, all memory translation mechanisms may be deactivated, and a flat memory space may be provided. Some embodiments may include recording and storing every memory access of executing the dynamic variant of the program instruction stream in the first table in the flat memory space.

In some embodiments of the present disclosure, the randomized input arguments selected may be passed into the program code generator to produce a dynamic variant of the program instruction stream that is custom-tailored to the input arguments. This custom-tailored version should not be used as final product code because it is not static and may thus represent a security concern. It may further the process and facilitate simpler program code usage.

In some embodiments of the present disclosure, the generated dynamic code may be executed on the accelerator processing unit. During execution, all memory translation mechanisms in the system may be deactivated and a flat memory space may be provided. Memory access, direction, and address may be recorded using a suitable hardware mechanism, such as the access recorder unit, and stored for later use.

In some embodiments of the present disclosure, the computer system may be configured to generate the address translation list by pre-calculating address access patterns based on the first set of input arguments.

In some embodiments of the present disclosure, memory address replacement may be used based on a deterministic prediction. For product code, once the static program code has been validated, the memory access pattern for a set of input arguments can be predicted and a list of memory accesses may be loaded into the access recorder unit beforehand. The address pattern may be pre-calculated based on the input arguments and the address translation list loaded into the access recorder unit for injection of the memory addresses.

In some embodiments of the present disclosure, the memory access may include an address and data. In some embodiments, the memory access may be thus fully described.

In some embodiments of the present disclosure, the computer system may be configured to store the address translation list in the access recorder unit. From the access recorder unit, the address translation list may be used for further address translation in a further step of the process or by further variants of the program instruction stream.

In some embodiments of the present disclosure, method may include replacing the addresses for the memory access based on the order of the memory requests of the program instruction stream. In some embodiments, replacement of memory addresses may be based strictly on the order of memory requests for efficient execution of the program code.

In some embodiments of the present disclosure, the method may include preloading the address translation list into the access recorder unit before executing the program instruction stream. From the access recorder unit, the address translation list may be used for further address translation in a further step of the process or by further variants of the program instruction stream.

In some embodiments of the present disclosure, the access recorder unit may be configured to record memory accesses as well as to inject memory accesses to the memory. The access recorder unit may store the memory accesses of a previous run (e.g., of a dynamic variant of the program instruction stream) and may deliver the stored memory accesses in a following run (e.g., of a static variant of the program instruction stream).

In some embodiments of the present disclosure, additionally or alternatively, the access recorder unit may be configured with a selection element for recording a memory access or injecting a memory access to the memory. Such a configuration may facilitate the handling of the access recorder unit for being used in different phases of the validation process of memory access patterns.

In some embodiments of the present disclosure, additionally or alternatively, the computer system may be configured to repeat execution of the static variant of the program instruction stream with different sets of input arguments for validating the memory access patterns. Repeating the execution may assure validity of the static program code and predetermined access patterns across many input arguments.

In some embodiments of the present disclosure, additionally or alternatively, the computer system may be configured to use an automated regression system for repeatedly validating the memory access patterns with different sets of input arguments. Multiple combinations of input arguments may thus be used for assuring validity of the static program code and predetermined access patterns across may input arguments.

In accordance with some embodiments of the present disclosure, a computer program product may validate memory access patterns of a static variant of a program instruction stream on a computer system. The computer system may be configured with a randomizing unit, a program code generator, an accelerator processing unit, an access recorder unit, and a memory. In some embodiments of the present disclosure, the computer program product includes a computer readable storage medium having program instructions embodied therewith. The program instructions may be executable by the computer system to cause the computer system to perform a method. The method may include storing the primary memory access patterns in a first table in the flat memory space and producing, with a code generator, a static variant of a program instruction stream agnostic of the input arguments. The method may include passing the first set of input arguments to the code generator and executing the static variant of the program instruction stream on the accelerator processing unit; the virtual addresses may be replaced by address translations provided in the address translation list. The method may include recording and storing secondary memory access patterns of the executing the static variant of the program instruction stream in a second table in the flat memory space and comparing the secondary memory access patterns stored in the second table to the primary memory access patterns stored in the first table. The method may include validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

In some embodiments of the present disclosure, not matching memory access patterns could be an indication that the memory access pattern is incorrect, and/or that the static variant of the code is not capable of producing the same results as the dynamic variant (e.g., one or more of the variants of the code are likely faulty).

In some embodiments of the present disclosure, a data processing system for execution of a data processing program is proposed, including computer readable program instructions for performing a method. The method may include storing the primary memory access patterns in a first table in the flat memory space and producing, with a code generator, a static variant of a program instruction stream agnostic of the input arguments. The method may include passing the first set of input arguments to the code generator and executing the static variant of the program instruction stream on the accelerator processing unit; the virtual addresses may be replaced by address translations provided in the address translation list. The method may include recording and storing secondary memory access patterns of the executing the static variant of the program instruction stream in a second table in the flat memory space and comparing the secondary memory access patterns stored in the second table to the primary memory access patterns stored in the first table. The method may include validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

In some embodiments of the present disclosure, the address translation list may be generated by passing the first set of input arguments to the program code generator for producing a dynamic variant of the program instruction stream tailored to the first set of input arguments and executing the dynamic variant of the program instruction stream on the accelerator processing unit; during execution, all memory translation mechanisms may be deactivated, and a flat memory space may be provided. The embodiment may further include recording and storing memory access of the executing the dynamic variant of the program instruction stream in the first table in the flat memory space.

The above summary is not intended to describe each illustrated embodiment or every implement of the disclosure.

BRIEF DESCRIPTION OF THE DRAWINGS

The drawings included in the present application are incorporated into, and form part of, the specification. The drawings illustrate embodiments of the present disclosure and, along with the description, serve to explain the principles of the disclosure. The drawings are only illustrative of certain embodiments and do not limit the disclosure.

DETAILED DESCRIPTION

Figure 1:
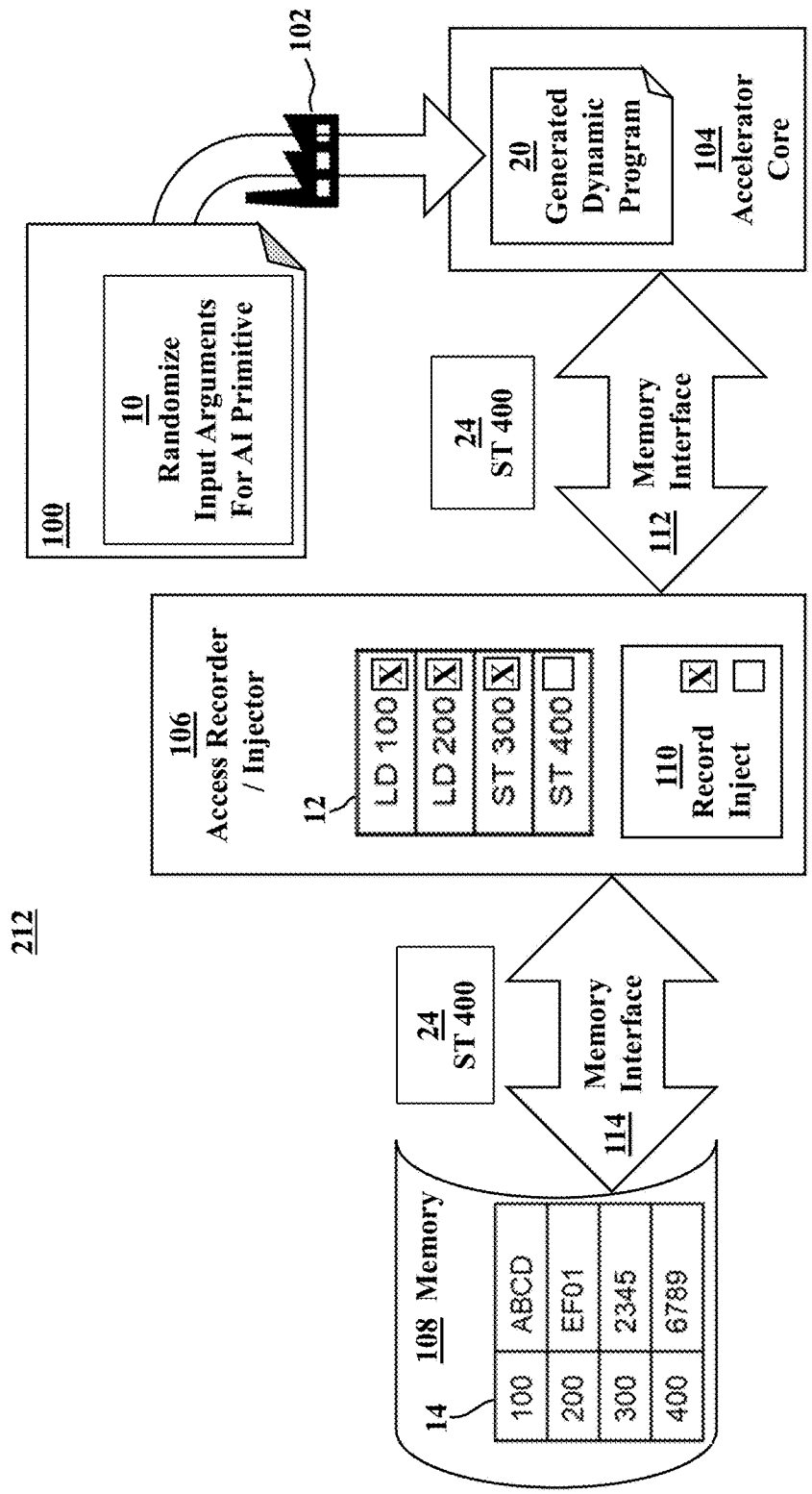
FIG. 1 depicts a computer system for validating memory access patterns of a static variant of a program instruction stream executing a dynamic variant of the program instruction stream for creating an address translation list in accordance with some embodiments of the present disclosure.

The present disclosure relates in general to data processing systems and, more specifically, to a computer system, a computer program product, a data processing system, and a computer implemented method for validating memory access patterns of a static variant of a program instruction stream.

In the drawings, like elements may be referred to with the same reference numerals. The drawings are schematic representations not intended to portray specific parameters of the present disclosure. Moreover, the drawings are only illustrative of certain embodiments and do not limit the disclosure.

The illustrative embodiments described herein provide a computer system for validating memory access patterns of a static variant of a program instruction stream. The computer system may include a randomizing unit, a program code generator, an accelerator processing unit, an access recorder unit and a memory.

The illustrative embodiments may further be used for randomizing a first set of input arguments and generating an address translation list for virtual addresses based on memory access patterns to a flat memory space of the memory and storing memory accesses in a first table in a flat memory space. The illustrative embodiments may be used for passing the first set of input arguments to a program code generator for producing a static variant of the program instruction stream that is agnostic of the input arguments and executing the static variant of the program instruction stream on the accelerator processing unit; during execution, for all memory accesses, the addresses may be discarded and replaced by the addresses provided in the address translation list. The illustrative embodiments may be used for recording and storing memory access of executing the static variant of the program instruction stream in a second table in the flat memory space and comparing the memory access patterns stored in the second table to memory accesses patterns stored in the first table. The illustrative embodiments may be used for validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

FIG. 1 depicts a computer system 212 for validating memory access patterns of a static variant of a program instruction stream in accordance with some embodiments of the present disclosure. The system 212 is shown in a first run executing a dynamic variant of the program instruction stream for generating an address translation list 12.

The computer system 212 includes a randomizing unit 100, a program code generator 102, an accelerator processing unit 104, an access recorder unit 106, and a memory 108. The computer system 212 is configured to perform the proposed computer implemented method for validating memory access patterns of a static variant of a program instruction stream.

The input arguments 10 may be submitted to a deep learning algorithm that may be implemented by the program instruction stream. The input arguments 10 may be selected by randomizing a first set of input arguments 10 with the randomizing unit 100.

The input arguments 10 may be passed to the program code generator 102 to produce a dynamic variant of the program instruction stream that is custom-tailored to the first set of input arguments 10. The custom-tailored version should not be used as the final product code because it is not static and, therefore, it may represent a security concern. It may be used to further the process and facilitate simpler code usage.

The generated dynamic code 20 may be executed on the accelerator processing unit 104. During execution, all memory translation mechanisms in the computer system 212 may be deactivated. A flat memory space may be provided. Memory access, direction, and address may be recorded using the access recorder unit 106 or other suitable hardware mechanism and stored in the address translation list 12 for later use. The address translation list 12 may be stored in the access recorder unit 106.

Memory access, including address and data, of executing the dynamic variant of the program instruction stream may be stored in the first table 14 in the flat memory space. In some embodiments, every memory access of executing the dynamic variant of the program instruction stream may be stored in the first table 14.

Memory accesses in the embodiment shown in FIG. 1 may be performed by the memory interfaces 112, 114. For example, the store command 24 (ST 400=store in address 400) in FIG. 1 is being executed over the memory interfaces 112, 114. The store command 24 is shown as ST 400 which means store in address 400. Under the address 400 in memory 108, data may be stored.

The access recorder unit 106 may be configured to record memory accesses as well as to inject memory accesses to the memory 108. Thus, the access recorder unit 106 may include a selection element 110 for recording a memory access or injecting a memory access to the memory 108. During execution of the dynamic variant of the program instruction stream, the selector element 110 may be switched to record as shown in FIG. 1.

Figure 2:
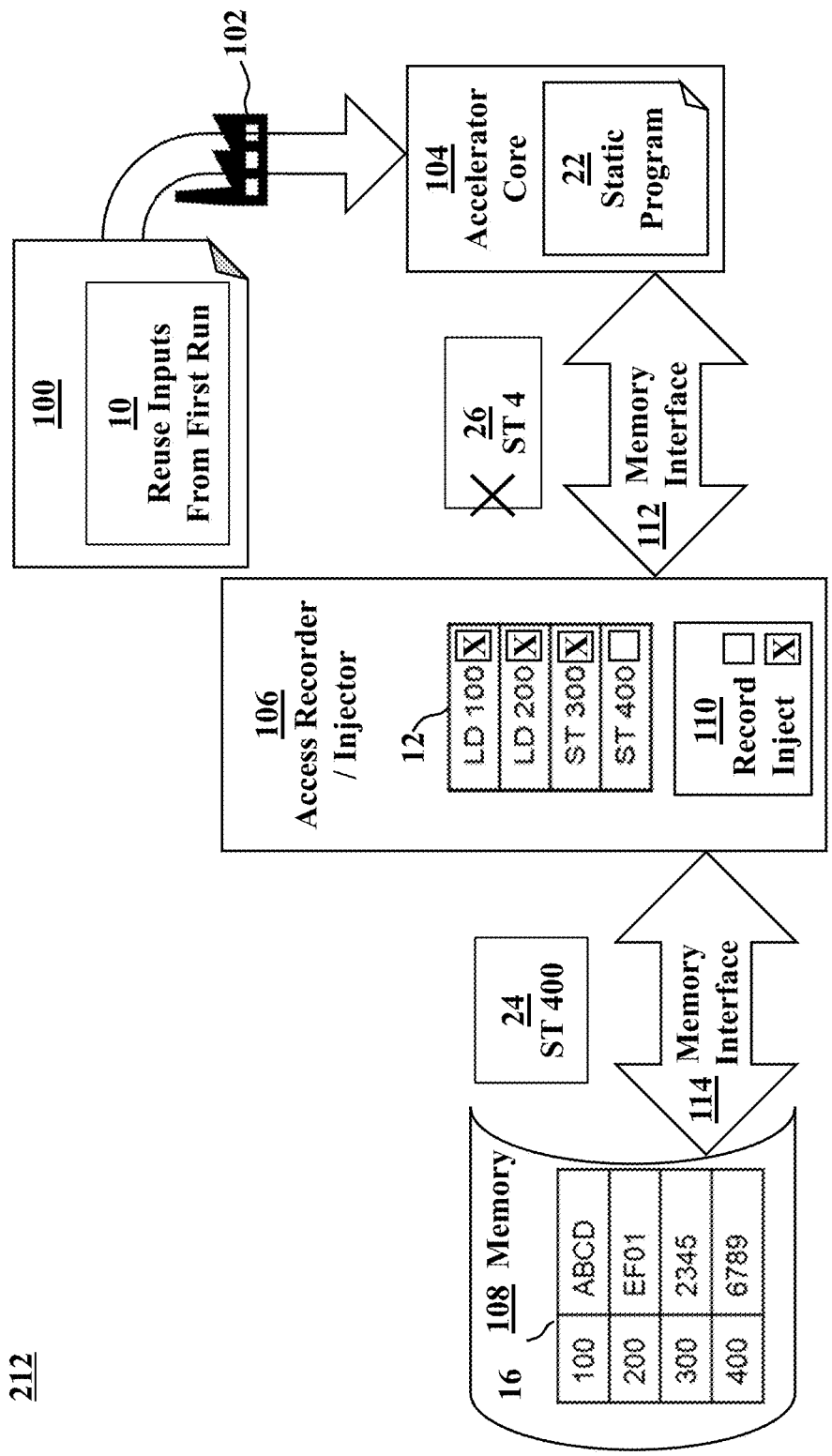
FIG. 2 depicts a computer system executing a static variant of a program instruction stream for validating memory access patterns in accordance with some embodiments of the present disclosure.

FIG. 2 depicts a computer system 212 in a second run executing a static variant of a program instruction stream for validating memory access patterns. In this run, memory address replacement may be performed based on the pre-recorded address translation list 12.

The algorithm implemented in the program instruction stream may be executed using the same input arguments 10 selected in FIG. 1. The static or production level program code may be used. The memory accesses observed during such an invocation may differ from those in the first run because the accelerator processing unit 104 the program code is executed on may not support the means of address translation.

To assure the memory access pattern (not the actual memory addresses) of the second run matches that of the first run, the address translation list 12 may be preloaded with the memory accesses recorded during the first run. For every memory access observed during the second run, the virtual address may be ignored, such as by being marked by the cross for the respective store command 26, and replaced by the address recorded during the first run and stored in the address translation list 12. The replacement may be based strictly on the order of the memory requests.

Memory access of executing the static variant of the program instruction stream may be recorded and stored in a second table 16 in the flat memory space of the memory 108.

In some embodiments, every memory access may be recorded in the second table 16.

If the access pattern recorded during the first run matches the access pattern imposed by the static program 22 code, then the final program output may be required to match that of the first run. The combination of program code and access pattern may then be considered correct for the given set of input arguments 10. Thus, the memory access patterns stored in the second table 16 may be compared to memory access patterns stored in the first table 14 during the first run with the dynamic variant of the program instruction stream.

If the memory access patterns in the second table 16 match with the memory access patterns in the first table 14, then the memory access patterns are validated for the set of input arguments 10. Validation of the memory access patterns may prove functional equivalence of static and dynamic program code.

If the memory access patterns in the second table 16 fail to match with the memory access patterns in the first table 14, then the memory access patterns may be discarded.

To assure validity of the static program 22 code, predetermined access patterns across many input arguments for both runs depicted in FIG. 1 and FIG. 2 may be repeated for other combinations of input arguments. In some embodiments, one or more of the combinations of input arguments may be selected using an automated regression system.

Figure 3:
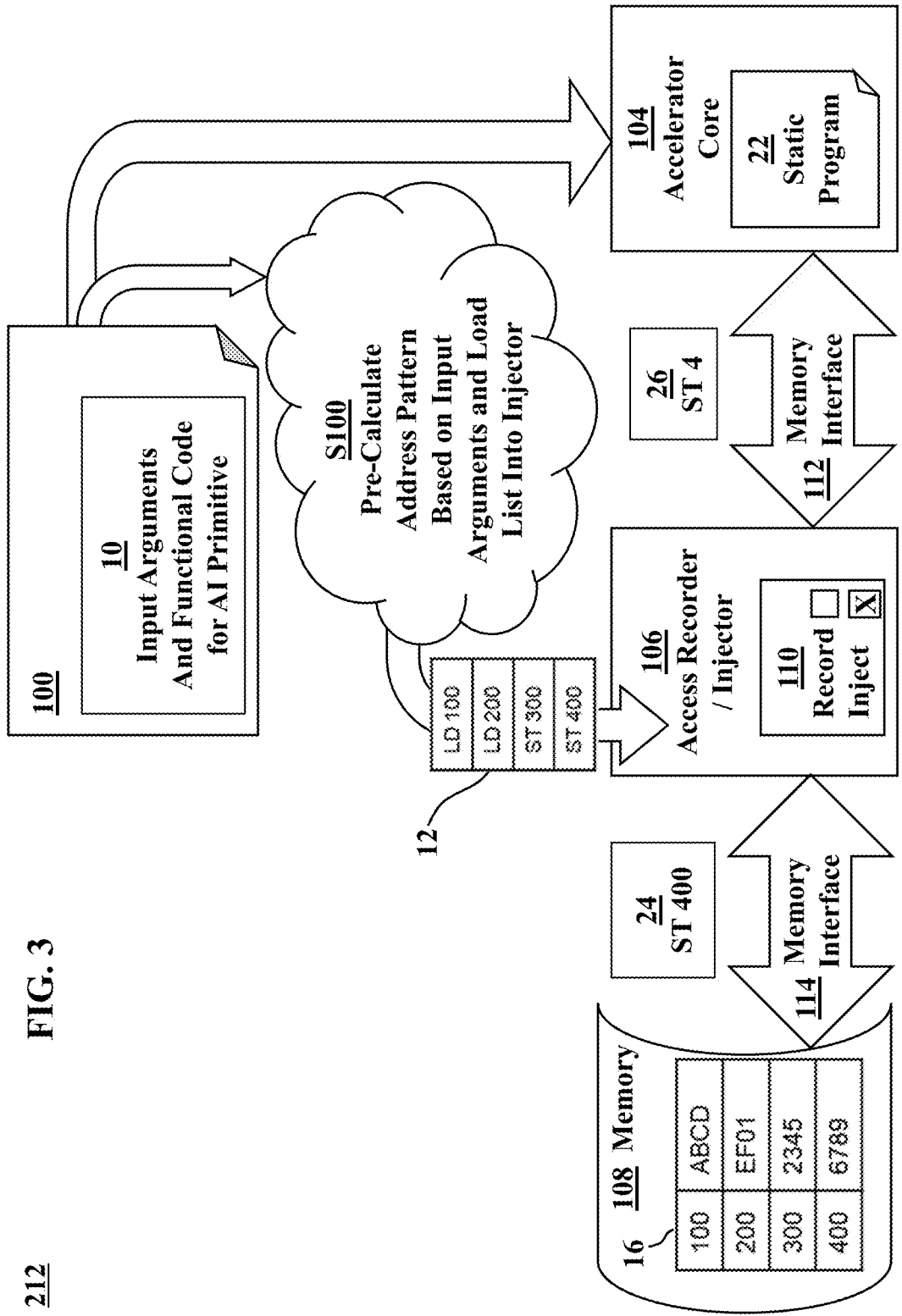
FIG. 3 depicts a computer system for validating memory access patterns of a static variant of a program instruction stream by pre-calculating address access patterns in accordance with some embodiments of the present disclosure.

FIG. 3 depicts a computer system 212 for validating memory access patterns of a static variant of a program instruction stream according to some embodiments of the present disclosure. The system 212 may include pre-calculating address access patterns. Memory address replacement may be performed based on a deterministic prediction of the memory access patterns.

For product code, once static program code has been validated, a memory access pattern for a first set of input arguments 10 may be predicted, and a list of memory accesses may be loaded into the access recorder unit beforehand. The address pattern may thus be pre-calculated at precalculation S100 based on the first set of input arguments 10. The pre-calculation may be loaded as the address translation list 12; in some embodiments, the pre-calculation may be loaded directly into the access recorder unit 106 in the injector mode such that the selector element 110 is switched to inject as shown in FIG. 3.

Figure 4:
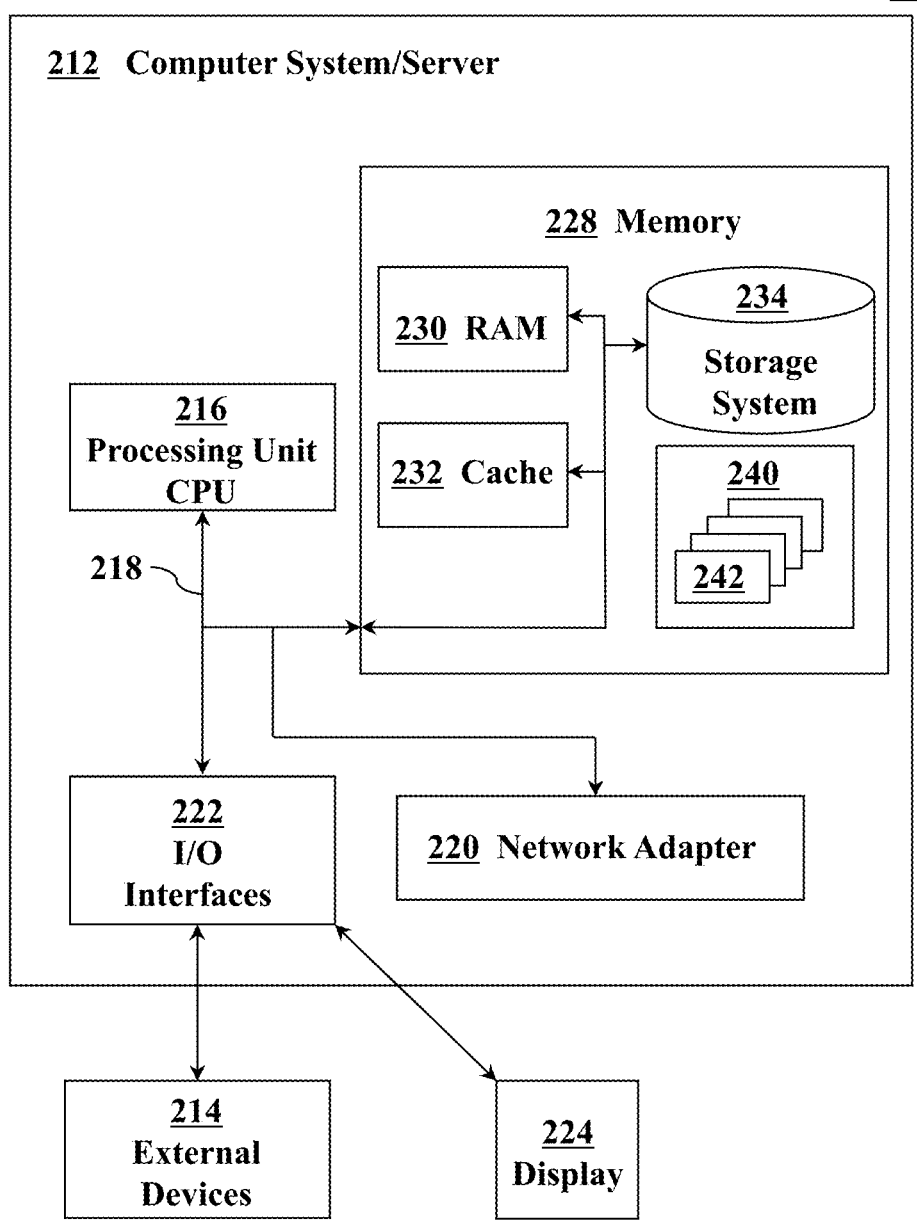
FIG. 4 depicts an example embodiment of a data processing system for executing a method in accordance with some embodiments of the present disclosure.

FIG. 4 shows a schematic of an example of a data processing system 210. A data processing system 210 is shown; in some embodiments, one or more other suitable data processing systems may be used. The data processing system 210 may be capable of implementing and/or performing any of the functionality described herein.

The data processing system 210 includes a computer system/server 212. The computer system/server may be operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 212 may be described in the general context of computer system executable instructions (e.g., program modules) being executed by a computer system. Program modules may include, for example, routines, programs, objects, components, logic, data structures, and so on that perform particular tasks or implement particular data types (e.g., abstract data types). The computer system/server 212 may be practiced in distributed cloud computing environments where tasks are performed by remote processing devices that are linked through a communications network. In a distributed cloud computing environment, program modules may be located in both local and remote computer system storage media including memory storage devices.

The computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

The bus 218 represents one or more of any of several types of bus structures. These bus structures may include a memory bus, memory controller, peripheral bus, accelerated graphics port, and/or processor or local bus using any of a variety of bus architectures. For example, such architectures include an Industry Standard Architecture (ISA) bus, a Micro Channel Architecture (MCA) bus, an Enhanced ISA (EISA) bus, a Video Electronics Standards Association (VESA) local bus, and/or a Peripheral Component Interconnect (PCI) bus.

Computer system/server 212 may include a variety of computer system readable media. Such media may be any available media that is accessible by computer system/server 212, and it includes both volatile and non-volatile media, removable and non-removable media.

System memory 228 may include computer system readable media in the form of volatile memory, such as random access memory (RAM) 230 and/or cache memory 232. Computer system/server 212 may further include other removable/non-removable, volatile/non-volatile computer system storage media. For example, the storage system 234 may be provided for reading from and writing to a non-removable, non-volatile magnetic media (e.g., a hard drive; not shown). In some embodiments, a magnetic disk drive for reading from and writing to a removable, non-volatile magnetic disk (e.g., a floppy disk), and an optical disk drive for reading from or writing to a removable, non-volatile optical disk such as a CD-ROM, DVD-ROM, or other optical media may be provided. In such embodiments, each storage mechanism may be connected to the bus 218 by one or more data media interfaces. In some embodiments, memory 228 may include at least one program product having a set (e.g., at least one) of program modules that are configured to carry out the functions of embodiments of the present disclosure.

A program/utility 240, having a set (e.g., at least one) of program modules 242, may be stored in the memory 228. An operating system, one or more application programs, other program modules, and/or program data may also be stored in the memory 228. Each of the operating system, one or more application programs, other program modules, and program data or some combination thereof, may include one or more implementations of a networking environment. Program modules 242 may perform the functions and/or methodologies of embodiments of the present disclosure as described herein.

The computer system/server 212 may communicate with one or more external devices 214 such as a keyboard, a pointing device, a display 224, and the like. The computer system/server 212 may communicate with one or more devices that enable a user to interact with computer system/server 212 and/or any devices that enable computer system/server 212 to communicate with one or more other computing devices (e.g., network card, modem, et cetera). Such communication may occur via Input/Output (I/O) interfaces 222 and/or other interfaces. The computer system/server 212 may communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It is to be understood that although not shown, other hardware and/or software components may be used in conjunction with the computer system/server 212. Examples may include, but are not limited to: microcode, device drivers, redundant processing units, external disk drive arrays, RAID systems, tape drives, and data archival storage systems, and the like.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing and/or processing devices from a computer readable storage medium and/or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device may receive computer readable program instructions from the network and forward the computer readable program instructions for storage in a computer readable storage medium within the respective computing and/or processing device.

Computer readable program instructions for carrying out operations of the present disclosure may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

In accordance with some embodiments of the present disclosure, a computer system may include a randomizing unit, a program code generator, an accelerator processing unit, an access recorder unit, and a memory. The computer system may be configured to perform operations including randomizing a first set of input arguments and generating, to a flat memory space of the memory, an address translation list for virtual addresses based on primary memory access patterns. The operations may include storing the primary memory access patterns in a first table in the flat memory space and producing, with a code generator, a static variant of a program instruction stream agnostic of the input arguments. The operations may include passing the first set of input arguments to the code generator and executing the static variant of the program instruction stream on the accelerator processing unit; the virtual addresses may be replaced by address translations provided in the address translation list. The operations may include recording and storing secondary memory access patterns of the executing the static variant of the program instruction stream in a second table in the flat memory space and comparing the secondary memory access patterns stored in the second table to the primary memory access patterns stored in the first table. The operations may include validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

A flat memory model may refer to a memory addressing paradigm in which the memory appears to the program as a single contiguous address space. The processing unit may directly and linearly address all of the available memory locations without having to resort to any sort of memory segmentation or paging schemes.

In some embodiments of the present disclosure, a memory address replacement may be performed based on the pre-recorded address translation list.

Randomized input arguments into the deep learning algorithm implemented by the program code are selected. The static variant of the program instruction stream, which may correspond to a production level program code being used with the deep learning algorithm, is executed with these arguments. The accelerator unit the static program code is being executed on does not support any means of address translation. Therefore, the pre-recorded address translation list may be used. For every memory access, the virtual address may be ignored and replaced by the address of the address translation list.

If the access pattern imposed by the static program code matches that of the pre-recorded address list which is already verified, the static program code and the access pattern may be considered correct for the given set of input arguments. Thus, the memory access pattern may be validated.

The disclosure offers several benefits and enables efficient testing of static program code templates within the fields of artificial intelligence acceleration.

The disclosure removes the need to know or the need to simulate a memory access pattern within a testing environment. It facilitates shift-left for testing especially during the development phase of the accelerator program code since the memory access pattern is being recorded during an initial run. The test environment effort is considerably reduced. The method significantly simplifies the testing environment by removing the need for a memory translation unit or software.

The disclosure may be of value primarily to developers of embedded accelerators with extended security needs. Further it may be of value for verification tool vendors.

In some embodiments of the present disclosure, additionally or alternatively, the address translation list may be generated by passing the first set of input arguments to the program code generator for producing a dynamic variant of the program instruction stream tailored to the first set of input arguments and executing the dynamic variant of the program instruction stream on the accelerator processing unit; during execution, all memory translation mechanisms may be deactivated, and a flat memory space may be provided. The embodiment may further include recording and storing memory access of the executing the dynamic variant of the program instruction stream in the first table in the flat memory space.

The randomized input arguments may be passed into the program code generator to produce a dynamic variant of the program instruction stream that is custom-tailored to the input arguments. This custom-tailored version should not be used as final product code because it is not static and could present a security concern. It may be used as a means to further the steps of the process and facilitate simpler program code usage.

The generated dynamic code may be executed on the accelerator processing unit. During execution, all memory translation mechanisms in the system may be deactivated and a flat memory space may be provided. All memory access, direction, and address may be recorded using a suitable hardware mechanism, such as with an access recorder unit, and stored for later use.

In some embodiments of the present disclosure, additionally or alternatively, the address translation list may be generated by pre-calculating address access patterns based on the first set of input arguments.

In some embodiments of the present disclosure, memory address replacement may be used based on a deterministic prediction. For product code, once the static program code has been validated, the memory access pattern for a set of input arguments can be predicted and a list of memory accesses can be loaded into the access recorder unit beforehand. In some embodiments, the address pattern may be pre-calculated based on the input arguments and the address translation list loaded into the access recorder unit for injection of the memory addresses.

In some embodiments of the present disclosure, additionally or alternatively, the memory access may include an address and data to fully describe the memory access.

In some embodiments of the present disclosure, additionally or alternatively, the address translation list may be stored in the access recorder unit. From the access recorder unit, the address translation list may be used for address translation, for example, in an additional part of the process or by further variants of the program instruction stream.

In some embodiments of the present disclosure, additionally or alternatively, replacing the addresses for the memory access may be based on the order of the memory requests of the program instruction stream. In some embodiments, replacement of memory addresses may be based strictly on the order of memory requests for efficient execution of the program code.

In some embodiments of the present disclosure, additionally or alternatively, the address translation list may be preloaded into the access recorder unit before executing the program instruction stream. From the access recorder unit, the address translation list may be used for further address translation in a further step of the process or by further variants of the program instruction stream.

In some embodiments of the present disclosure, additionally or alternatively, the access recorder unit may be configured to record memory accesses as well as to inject memory accesses to the memory. Thus, the access recorder unit may store the memory accesses of a previous run (e.g., of a dynamic variant of the program instruction stream) and may deliver the stored memory accesses in a following run (e.g., of a static variant of the program instruction stream).

In some embodiments of the present disclosure, additionally or alternatively, the access recorder unit may be configured with a selection element for recording a memory access or injecting a memory access to the memory. Such a configuration may facilitate the handling of the access recorder unit for being used in different phases of the validation process of memory access patterns.

In some embodiments of the present disclosure, additionally or alternatively, execution of the static variant of the program instruction stream may be repeated with different sets of input arguments for validating the memory access patterns. Repeating the execution may assure validity of the static program code and predetermined access patterns across many input arguments.

In some embodiments of the present disclosure, additionally or alternatively, an automated regression system may be used for repeating validating the memory access patterns with different sets of input arguments. Thus, various combinations of input arguments may be used for assuring validity of the static program code and predetermined access patterns across may input arguments.

In accordance with some embodiments of the present disclosure, a computer implemented method is proposed for validating memory access patterns of a static variant of a program instruction stream on a computer system, the computer system being at least configured with a randomizing unit, a program code generator, an accelerator processing unit, an access recorder unit, and a memory. The method may include storing the primary memory access patterns in a first table in the flat memory space and producing, with a code generator, a static variant of a program instruction stream agnostic of the input arguments. The method may include passing the first set of input arguments to the code generator and executing the static variant of the program instruction stream on the accelerator processing unit; the virtual addresses may be replaced by address translations provided in the address translation list. The method may include recording and storing secondary memory access patterns of the executing the static variant of the program instruction stream in a second table in the flat memory space and comparing the secondary memory access patterns stored in the second table to the primary memory access patterns stored in the first table. The method may include validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

In some embodiments, a memory address replacement may be performed based on the pre-recorded address translation list.

Randomized input arguments into the deep learning algorithm implemented by the program code may be selected. The static variant of the program instruction stream, which may correspond to a production level program code being used with the deep learning algorithm, may be executed with these arguments. The accelerator unit the static program code is being executed on does not support any means of address translation. The pre-recorded address translation list may thus be used. For every memory access, the virtual address may be ignored and replaced by the address of the address translation list.

If the access pattern imposed by the static program code matches that of the pre-recorded address list which is already verified, the static program code and the access pattern may be considered correct for the given set of input arguments. The memory access pattern is thus validated.

Using the proposed disclosure offers several benefits and enables efficient testing of static program code templates within the fields of artificial intelligence acceleration.

In some embodiments of the present disclosure, the computer system may be configured to generate the address translation list by passing the first set of input arguments to the program code generator for producing a dynamic variant of the program instruction stream being tailored to the first set of input arguments, executing the dynamic variant of the program instruction stream on the accelerator processing unit; during execution, all memory translation mechanisms may be deactivated, and a flat memory space may be provided. Some embodiments may include recording and storing every memory access of executing the dynamic variant of the program instruction stream in the first table in the flat memory space.

In some embodiments of the present disclosure, the randomized input arguments selected may be passed into the program code generator to produce a dynamic variant of the program instruction stream that is custom-tailored to the input arguments. This custom-tailored version should not be used as final product code because it is not static and may thus represent a security concern. It may further the process and facilitate simpler program code usage.

In some embodiments of the present disclosure, the generated dynamic code may be executed on the accelerator processing unit. During execution, all memory translation mechanisms in the system may be deactivated and a flat memory space may be provided. Memory access, direction, and address may be recorded using a suitable hardware mechanism, such as the access recorder unit, and stored for later use.

In some embodiments of the present disclosure, the computer system may be configured to generate the address translation list by pre-calculating address access patterns based on the first set of input arguments.

In some embodiments of the present disclosure, memory address replacement may be used based on a deterministic prediction. For product code, once the static program code has been validated, the memory access pattern for a set of input arguments can be predicted and a list of memory accesses may be loaded into the access recorder unit beforehand. The address pattern may be pre-calculated based on the input arguments and the address translation list loaded into the access recorder unit for injection of the memory addresses.

In some embodiments of the present disclosure, the memory access may include an address and data. In some embodiments, the memory access may be thus fully described.

In some embodiments of the present disclosure, the computer system may be configured to store the address translation list in the access recorder unit. From the access recorder unit, the address translation list may be used for further address translation in a further step of the process or by further variants of the program instruction stream.

In some embodiments of the present disclosure, method may include replacing the addresses for the memory access based on the order of the memory requests of the program instruction stream. In some embodiments, replacement of memory addresses may be based strictly on the order of memory requests for efficient execution of the program code.

In some embodiments of the present disclosure, the method may include preloading the address translation list into the access recorder unit before executing the program instruction stream. From the access recorder unit, the address translation list may be used for further address translation in a further step of the process or by further variants of the program instruction stream.

In some embodiments of the present disclosure, the access recorder unit may be configured to record memory accesses as well as to inject memory accesses to the memory. The access recorder unit may store the memory accesses of a previous run (e.g., of a dynamic variant of the program instruction stream) and may deliver the stored memory accesses in a following run (e.g., of a static variant of the program instruction stream).

In some embodiments of the present disclosure, additionally or alternatively, the access recorder unit may be configured with a selection element for recording a memory access or injecting a memory access to the memory. Such a configuration may facilitate the handling of the access recorder unit for being used in different phases of the validation process of memory access patterns.

In some embodiments of the present disclosure, additionally or alternatively, the computer system may be configured to repeat execution of the static variant of the program instruction stream with different sets of input arguments for validating the memory access patterns. Repeating the execution may assure validity of the static program code and predetermined access patterns across many input arguments.

In some embodiments of the present disclosure, additionally or alternatively, the computer system may be configured to use an automated regression system for repeatedly validating the memory access patterns with different sets of input arguments. Multiple combinations of input arguments may thus be used for assuring validity of the static program code and predetermined access patterns across may input arguments.

In accordance with some embodiments of the present disclosure, a computer program product may validate memory access patterns of a static variant of a program instruction stream on a computer system. The computer system may be configured with a randomizing unit, a program code generator, an accelerator processing unit, an access recorder unit, and a memory. In some embodiments of the present disclosure, the computer program product includes a computer readable storage medium having program instructions embodied therewith. The program instructions may be executable by the computer system to cause the computer system to perform a method. The method may include storing the primary memory access patterns in a first table in the flat memory space and producing, with a code generator, a static variant of a program instruction stream agnostic of the input arguments. The method may include passing the first set of input arguments to the code generator and executing the static variant of the program instruction stream on the accelerator processing unit; the virtual addresses may be replaced by address translations provided in the address translation list. The method may include recording and storing secondary memory access patterns of the executing the static variant of the program instruction stream in a second table in the flat memory space and comparing the secondary memory access patterns stored in the second table to the primary memory access patterns stored in the first table. The method may include validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

In some embodiments of the present disclosure, not matching memory access patterns could be an indication that the memory access pattern is incorrect, and/or that the static variant of the code is not capable of producing the same results as the dynamic variant (e.g., one or more of the variants of the code are likely faulty).

In some embodiments of the present disclosure, a data processing system for execution of a data processing program is proposed, including computer readable program instructions for performing a method. The method may include storing the primary memory access patterns in a first table in the flat memory space and producing, with a code generator, a static variant of a program instruction stream agnostic of the input arguments. The method may include passing the first set of input arguments to the code generator and executing the static variant of the program instruction stream on the accelerator processing unit; the virtual addresses may be replaced by address translations provided in the address translation list. The method may include recording and storing secondary memory access patterns of the executing the static variant of the program instruction stream in a second table in the flat memory space and comparing the secondary memory access patterns stored in the second table to the primary memory access patterns stored in the first table. The method may include validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

In some embodiments of the present disclosure, the address translation list may be generated by passing the first set of input arguments to the program code generator for producing a dynamic variant of the program instruction stream tailored to the first set of input arguments and executing the dynamic variant of the program instruction stream on the accelerator processing unit; during execution, all memory translation mechanisms may be deactivated, and a flat memory space may be provided. The embodiment may further include recording and storing memory access of the executing the dynamic variant of the program instruction stream in the first table in the flat memory space.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A computer system to validate memory access patterns, the computer system comprising a randomizing unit, a program code generator, an accelerator processing unit, an access recorder unit, and a memory, wherein the computer system is configured to perform operations, the operations comprising:
   receiving, by a randomizing unit, a first set of input arguments for a deep learning algorithm;
   randomizing the first set of input arguments;
   generating, to a flat memory space of the memory, an address translation list for virtual addresses based on primary memory access patterns, wherein the flat memory space is a single contiguous address space;
   storing the primary memory access patterns in a first table in the flat memory space;
   producing, with a code generator, a static variant of a program instruction stream agnostic of the input arguments;
   passing the first set of input arguments to the code generator;
   executing the static variant of the program instruction stream on the accelerator processing unit, wherein the virtual addresses are replaced by address translations provided in the address translation list;
   recording and storing secondary memory access patterns of the executing the static variant of the program instruction stream in a second table in the flat memory space;
   comparing the secondary memory access patterns stored in the second table to the primary memory access patterns stored in the first table; and
   validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

2. The computer system according to claim 1, wherein generating the address translation list comprises:

passing the first set of input arguments to the program code generator for producing a dynamic variant of the program instruction stream tailored to the first set of input arguments;
executing the dynamic variant of the program instruction stream on the accelerator processing unit, wherein memory translation mechanisms are deactivated during execution, and wherein the flat memory space is provided; and
recording and storing, in the first table in the flat memory space, memory access of the executing the dynamic variant of the program instruction stream.

3. The computer system according to claim 1, the operations further comprising:
generating the address translation list by pre-calculating address access patterns based on the first set of input arguments.

4. The computer system according to claim 1, wherein:
the memory access comprises an address and data.

5. The computer system according to claim 1, the operations further comprising:
storing the address translation list in the access recorder unit.

6. The computer system according to claim 1, the operations further comprising:
replacing the addresses for the memory access is based on the order of the memory requests of the program instruction stream.

7. The computer system according to claim 1, the operations further comprising:
preloading the address translation list into the access recorder unit before executing the program instruction stream.

8. The computer system according to claim 1, wherein:
the access recorder unit is configured to record memory accesses as well as to inject memory accesses to the memory.

9. The computer system according to claim 8, wherein:
the access recorder unit is configured with a selection element for recording a memory access or injecting a memory access to the memory.

10. The computer system according to claim 1, the operations further comprising:
repeating the executing of the static variant of the program instruction stream with a number of different sets of input arguments for validating the memory access patterns.

11. The computer system according to claim 10, the operations further comprising:
using an automated regression system for repeating validating the memory access patterns with a number of different sets of input arguments.

12. A computer implemented method for validating memory access patterns of a static variant of a program instruction stream on a computer system, the computer system being at least configured with a randomizing unit, a program code generator, an accelerator processing unit, an access recorder unit and a memory, the method at least comprising:
receiving, by a randomizing unit, a first set of input arguments for a deep learning algorithm;
randomizing the first set of input arguments;
generating, to a flat memory space of the memory, an address translation list for virtual addresses based on primary memory access patterns, wherein the flat memory space is a single contiguous address space;
storing the primary memory access patterns in a first table in the flat memory space;
producing, with a code generator, a static variant of a program instruction stream agnostic of the input arguments;
passing the first set of input arguments to the code generator;
executing the static variant of the program instruction stream on the accelerator processing unit, wherein the virtual addresses are replaced by address translations provided in the address translation list;
recording and storing secondary memory access patterns of the executing the static variant of the program instruction stream in a second table in the flat memory space;
comparing the secondary memory access patterns stored in the second table to the primary memory access patterns stored in the first table; and
validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

13. The method according to claim 12, the generating the address translation list comprising:
passing the first set of input arguments to the program code generator for producing a dynamic variant of the program instruction stream being tailored to the first set of input arguments;
executing the dynamic variant of the program instruction stream on the accelerator processing unit wherein during execution all memory translation mechanisms are deactivated, and a flat memory space is being provided; and
recording and storing every memory access of executing the dynamic variant of the program instruction stream in the first table in the flat memory space.

14. The method according to claim 12, the operations further comprising:
generating the address translation list by pre-calculating address access patterns based on the first set of input arguments.

15. The method according to claim 12, wherein:
the memory access comprises an address and data.

16. The method according to claim 12, the operations further comprising:
storing the address translation list in the access recorder unit.

17. The method according to claim 12, the operations further comprising:
replacing the addresses for the memory access is based on the order of the memory requests of the program instruction stream.

18. The method according to claim 12, the operations further comprising:
preloading the address translation list into the access recorder unit before executing the program instruction stream.

19. The method according to claim 12, wherein:
the access recorder unit is configured to record memory accesses as well as to inject memory accesses to the memory.

20. The method according to claim 19, wherein:
the access recorder unit is configured with a selection element for recording a memory access or injecting a memory access to the memory.

21. The method according to claim 12, further comprising:
repeating the executing of the static variant of the program instruction stream with a number of different sets of input arguments for validating the memory access patterns.

22. The method according to claim 21, further comprising:
using an automated regression system for repeating validating the memory access patterns with a number of different sets of input arguments.

23. A computer program product for validating memory access patterns using a system comprising a randomizing unit, a program code generator, an accelerator processing unit, an access recorder unit, and a memory, the computer program product comprising a non-transitory computer readable storage medium having program instructions embodied therewith, the program instructions executable by the computer system to cause the computer system to perform an operation, the operation comprising:
receiving, by a randomizing unit, a first set of input arguments for a deep learning algorithm;
randomizing the first set of input arguments;
generating, to a flat memory space of the memory, an address translation list for virtual addresses based on primary memory access patterns, wherein the flat memory space is a single contiguous address space;
storing the primary memory access patterns in a first table in the flat memory space;
producing, with a code generator, a static variant of a program instruction stream agnostic of the input arguments;
passing the first set of input arguments to the code generator;
executing the static variant of the program instruction stream on the accelerator processing unit, wherein the virtual addresses are replaced by address translations provided in the address translation list;
recording and storing secondary memory access patterns of the executing the static variant of the program instruction stream in a second table in the flat memory space;
comparing the secondary memory access patterns stored in the second table to the primary memory access patterns stored in the first table; and
validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

24. A data processing system for execution of a data processing program with computer readable program instructions for performing a function, the function comprising:
receiving, by a randomizing unit, a first set of input arguments for a deep learning algorithm;
randomizing the first set of input arguments;
generating, to a flat memory space of the memory, an address translation list for virtual addresses based on primary memory access patterns, wherein the flat memory space is a single contiguous address space;
storing the primary memory access patterns in a first table in the flat memory space;
producing, with a code generator, a static variant of a program instruction stream agnostic of the input arguments;
passing the first set of input arguments to the code generator;
executing the static variant of the program instruction stream on the accelerator processing unit, wherein the virtual addresses are replaced by address translations provided in the address translation list;
recording and storing secondary memory access patterns of the executing the static variant of the program instruction stream in a second table in the flat memory space;
comparing the secondary memory access patterns stored in the second table to the primary memory access patterns stored in the first table; and
validating the primary memory access patterns for the set of input arguments if the secondary memory access patterns in the second table match with the primary memory access patterns in the first table or, if the secondary memory access patterns in the second table do not match with the primary memory access patterns in the first table, discarding the primary memory access patterns.

25. The data processing system according to claim 24, the generating the address translation list comprising:
passing the first set of input arguments to the program code generator for producing a dynamic variant of the program instruction stream being tailored to the first set of input arguments;
executing the dynamic variant of the program instruction stream on the accelerator processing unit wherein during execution all memory translation mechanisms are deactivated, and a flat memory space is being provided; and
recording and storing every memory access of executing the dynamic variant of the program instruction stream in the first table in the flat memory space.

* * * * *